(12) United States Patent
Kimura et al.

(10) Patent No.: US 11,277,059 B2
(45) Date of Patent: Mar. 15, 2022

(54) CORE PRODUCT AND METHOD OF MANUFACTURING CORE PRODUCT

(71) Applicants: Mitsui High-tec, Inc., Kitakyushu (JP); HONDA MOTOR CO., LTD., Tokyo (JP)

(72) Inventors: Kenji Kimura, Kitakyushu (JP); Masato Kawano, Wako (JP)

(73) Assignees: MITSUI HIGH-TEC, INC., Kitakyushu (JP); HONDA MOTOR CO., LTD., Tokyo (JP)

( * ) Notice: Subject to any disclaimer, the term of this patent is extended or adjusted under 35 U.S.C. 154(b) by 268 days.

(21) Appl. No.: 16/681,935

(22) Filed: Nov. 13, 2019

(65) Prior Publication Data
US 2020/0161946 A1    May 21, 2020

(30) Foreign Application Priority Data

Nov. 15, 2018 (JP) .............................. JP2018-214905

(51) Int. Cl.
*H02K 15/03* (2006.01)
*H02K 1/27* (2006.01)
(Continued)

(52) U.S. Cl.
CPC ............. *H02K 15/03* (2013.01); *H02K 1/276* (2013.01); *H02K 1/28* (2013.01); *H02K 11/35* (2016.01); *H02K 15/12* (2013.01)

(58) Field of Classification Search
CPC ........ H02K 15/03; H02K 11/35; H02K 1/276; H02K 1/28; H02K 15/12
See application file for complete search history.

(56) References Cited

U.S. PATENT DOCUMENTS

| 8,362,668 | B2 * | 1/2013 | Takahashi | ............ | H02K 1/2766 310/156.47 |
| 8,922,084 | B2 * | 12/2014 | Nagai | .................. | H02K 1/2766 310/156.53 |

(Continued)

FOREIGN PATENT DOCUMENTS

| JP | 2008-054376 A | 3/2008 |
| JP | 2009-124815 A | 6/2009 |

(Continued)

OTHER PUBLICATIONS

Office Action dated Jul. 28, 2020, issued in counterpart JP Application No. 2018-214905, with English translation (24 pages).

*Primary Examiner* — Burton S Mullins
(74) *Attorney, Agent, or Firm* — Westerman, Hattori, Daniels & Adrian, LLP

(57) ABSTRACT

A core product includes a first core block and a second core block. The first core block includes: a first block body including a first end surface and a second end surface, and a first resin injection portion; a first solidified resin provided in the first resin injection portion; and a first gate mark integrated with the first solidified resin and protruding outward more than the first end surface. The second core block includes: a second block body including a third end surface and a fourth end surface, and a second resin injection portion; a second solidified resin provided in the second resin injection portion; and a second gate mark integrated with the second solidified resin and protruding outward more than the fourth end surface. The first core block and the second core block are stacked such that the second end surface and the third end surface face each other.

10 Claims, 8 Drawing Sheets

(51) Int. Cl.
      *H02K 1/276*       (2022.01)
      *H02K 15/12*       (2006.01)
      *H02K 11/35*       (2016.01)
      *H02K 1/28*       (2006.01)

(56) References Cited

U.S. PATENT DOCUMENTS

| | | | |
|---|---|---|---|
| 9,979,264 B2 * | 5/2018 | Ishimatsu | B29C 45/14 |
| 9,985,505 B2 * | 5/2018 | Honjo | H02K 15/03 |
| 10,116,193 B2 * | 10/2018 | Yamaguchi | H02K 1/2766 |
| 2018/0006509 A1 | 1/2018 | Kato et al. | |
| 2018/0212497 A1 * | 7/2018 | Okuyama | H02K 15/03 |
| 2018/0309351 A1 * | 10/2018 | Tachi | H02K 1/2706 |
| 2019/0238033 A1 * | 8/2019 | Okuyama | H02K 1/276 |
| 2020/0177038 A1 * | 6/2020 | Frohlich | H02K 1/276 |

FOREIGN PATENT DOCUMENTS

| | | |
|---|---|---|
| JP | 2009303485 A | 12/2009 |
| JP | 2013-9452 A | 1/2013 |
| JP | 2017-163757 A | 9/2017 |
| JP | 2017-208955 A | 11/2017 |
| JP | 2018-7421 A | 1/2018 |
| JP | 2019-180160 A | 10/2019 |
| WO | 2018/100936 A1 | 6/2018 |
| WO | 2018/189988 A1 | 10/2018 |

\* cited by examiner

US 11,277,059 B2

CORE PRODUCT AND METHOD OF MANUFACTURING CORE PRODUCT

CROSS-REFERENCE TO RELATED APPLICATIONS

This application is based upon and claims the benefit of priority from Japanese Patent Application No. 2018-214905, filed on Nov. 15, 2018, the entire contents of which are incorporated herein by reference.

FIELD

The present disclosure relates to a core product and a method of manufacturing a core product.

BACKGROUND

Japanese Unexamined Patent Publication No. 2013-9452 discloses a method of manufacturing a rotor core (core product) having a permanent magnet embedded in a core body. The method includes inserting a permanent magnet into a magnet insertion hole of the core body, compressing and cramping the core body by a lower mold and an upper mold, injecting a molten resin into the magnet insertion hole through a fine gate portion (gate hole) formed in the upper mold, and separating the upper mold and the lower mold to remove a rotor core from the molds after the injected molten resin is cured.

SUMMARY

A core product according to one aspect of the present disclosure includes a first core block and a second core block. The first core block includes: a first block body including a first end surface and a second end surface, and a first resin injection portion extending from the first end surface to the second end surface; a first solidified resin provided in the first resin injection portion; and a first gate mark integrated with the first solidified resin and protruding outward more than the first end surface. The second core block includes: a second block body including a third end surface and a fourth end surface, and a second resin injection portion extending from the third end surface to the fourth end surface; a second solidified resin provided in the second resin injection portion; and a second gate mark integrated with the second solidified resin and protruding outward more than the fourth end surface. The first core block and the second core block are stacked such that the second end surface and the third end surface face each other.

A method of manufacturing a core product according to another aspect of the present disclosure includes: forming a first core block by injecting a molten resin into a first resin injection portion extending from a first end surface to a second end surface of a first block body, such that a first solidified resin is provided in the first resin injection portion and a first gate mark is integrated with the first solidified resin and protrudes outward more than the first end surface; forming a second core block by injecting a molten resin into a second resin injection portion extending from a third end surface to a fourth end surface of a second block body, such that a second solidified resin is provided in the second resin injection portion and a second gate mark is integrated with the second solidified resin and protrudes outward more than the fourth end surface; and stacking the first core block and the second core block such that the second end surface and the third end surface face each other.

DETAILED DESCRIPTION

In the following description, with reference to the drawings, the same reference numbers are assigned to the same components or to similar components having the same function, and overlapping description is omitted.

Configuration of Rotor

Figure 1:
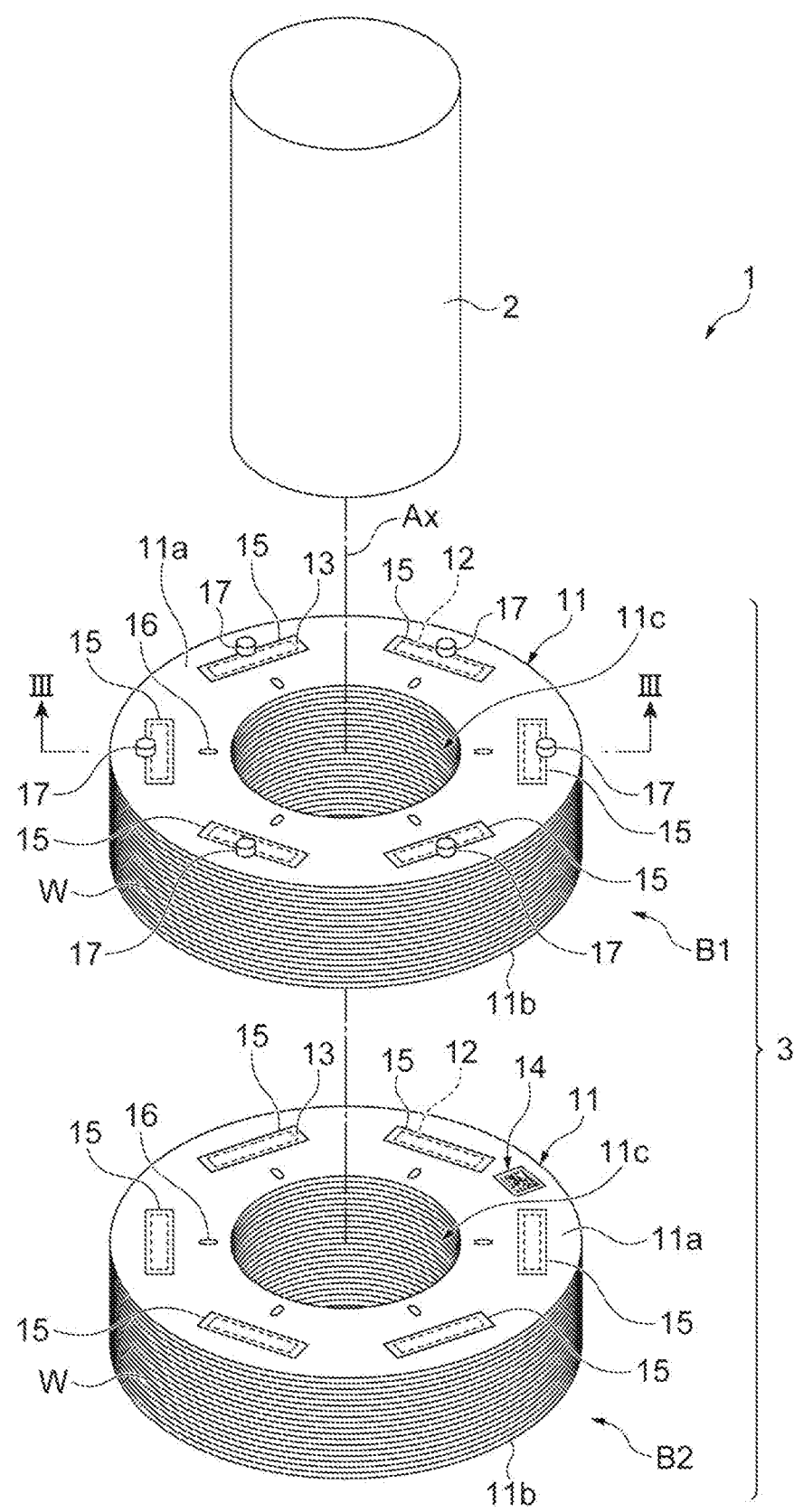
FIG. 1 is an exploded perspective view of an example rotor when viewed from above.
Figure 2:
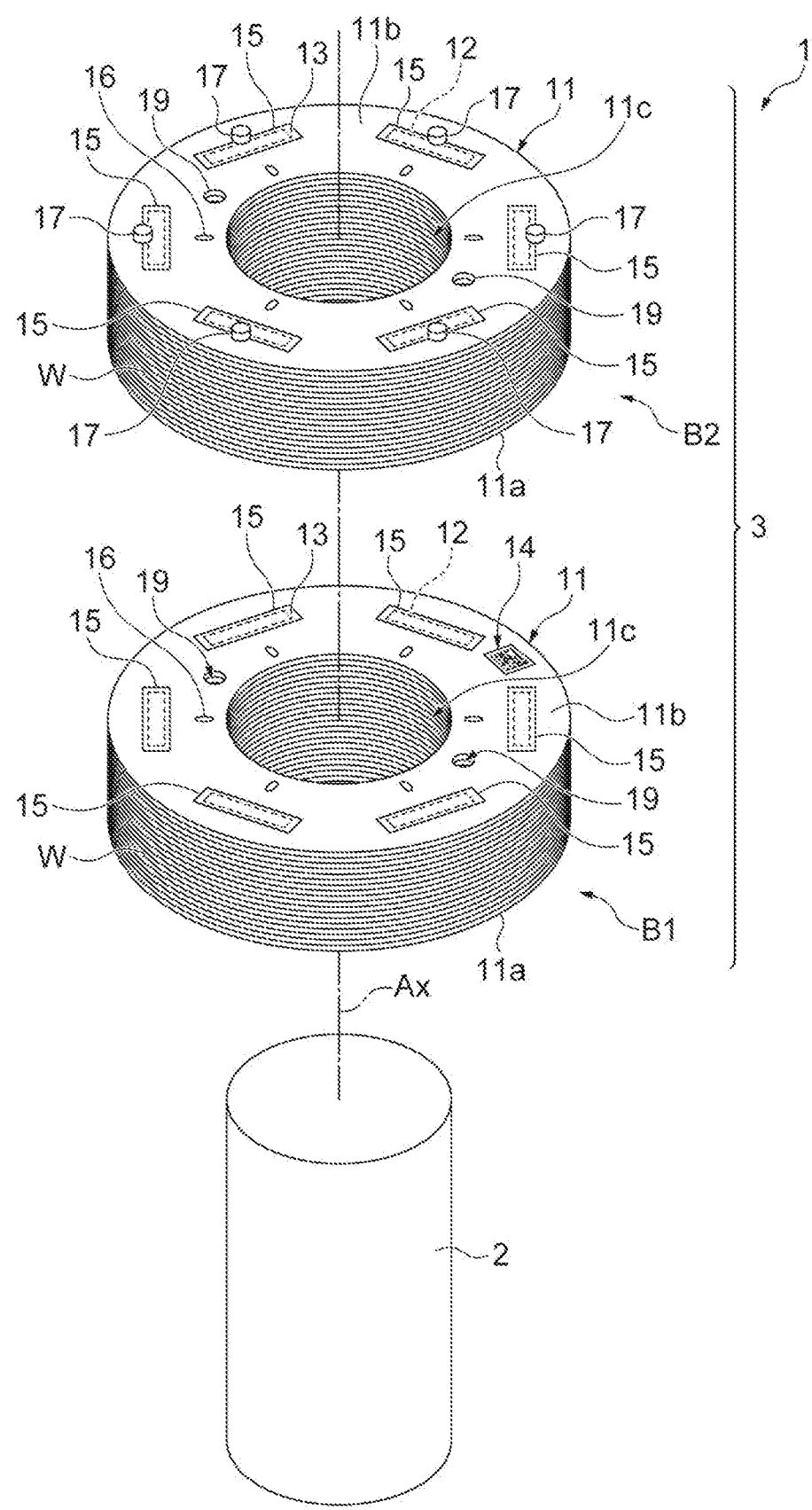
FIG. 2 is an exploded perspective view of the rotor illustrated in FIG. 1 flipped vertically.
Figure 3:
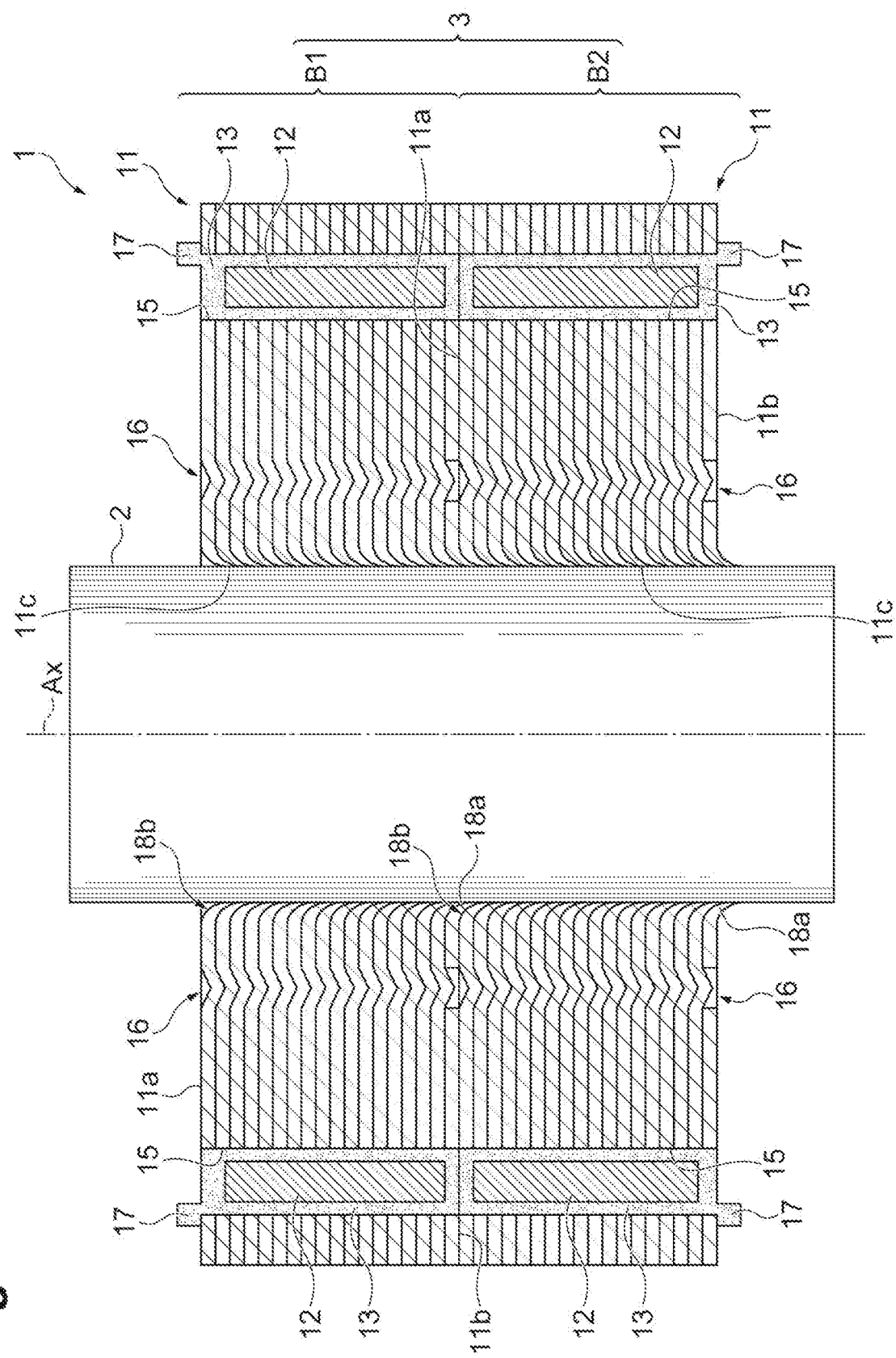
FIG. 3 is a sectional view of the rotor illustrated in FIG. 1 along line III-III.
Figure 4:
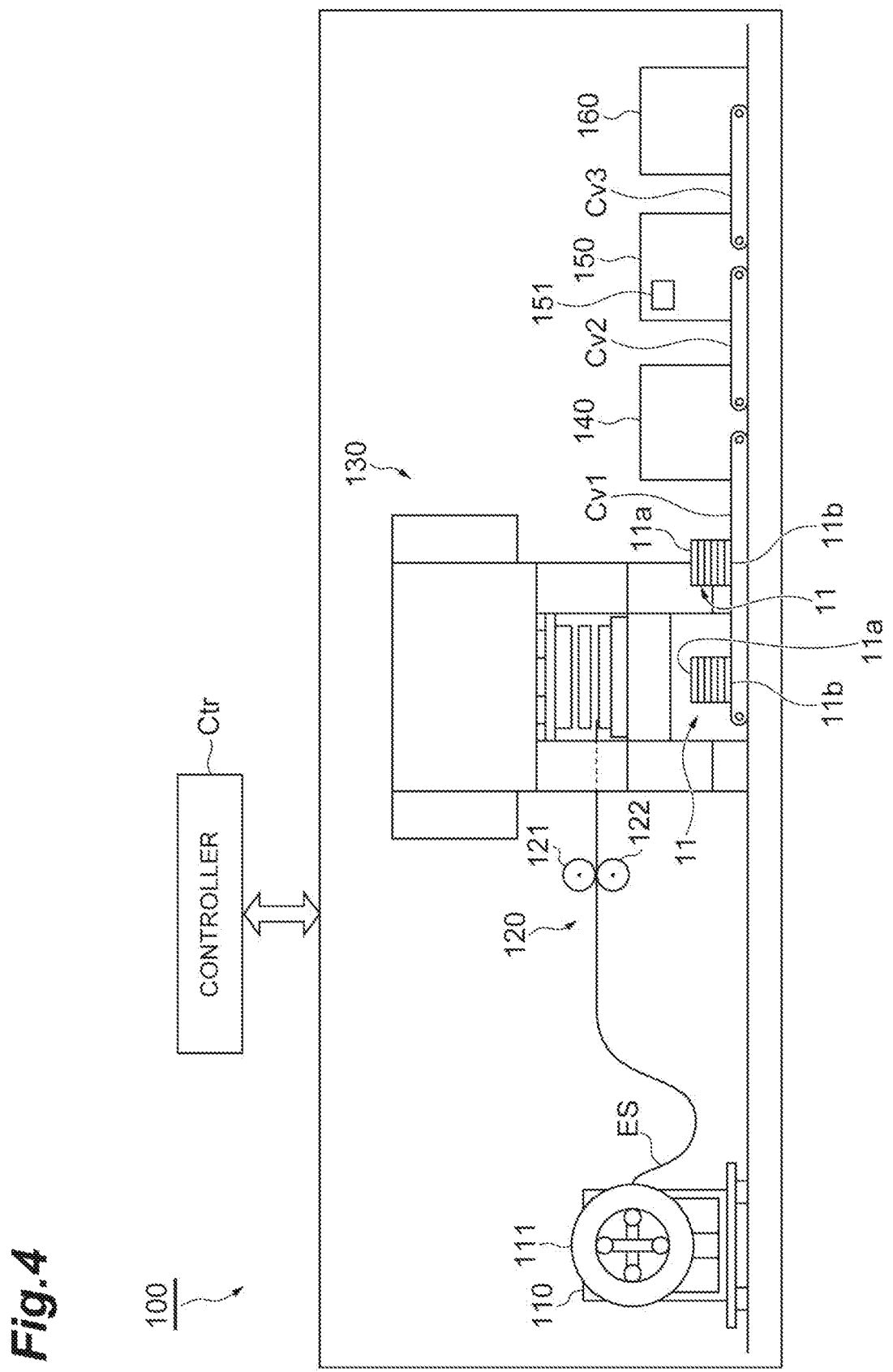
FIG. 4 is a schematic view illustrating an example apparatus for manufacturing a core product.
Figure 5:
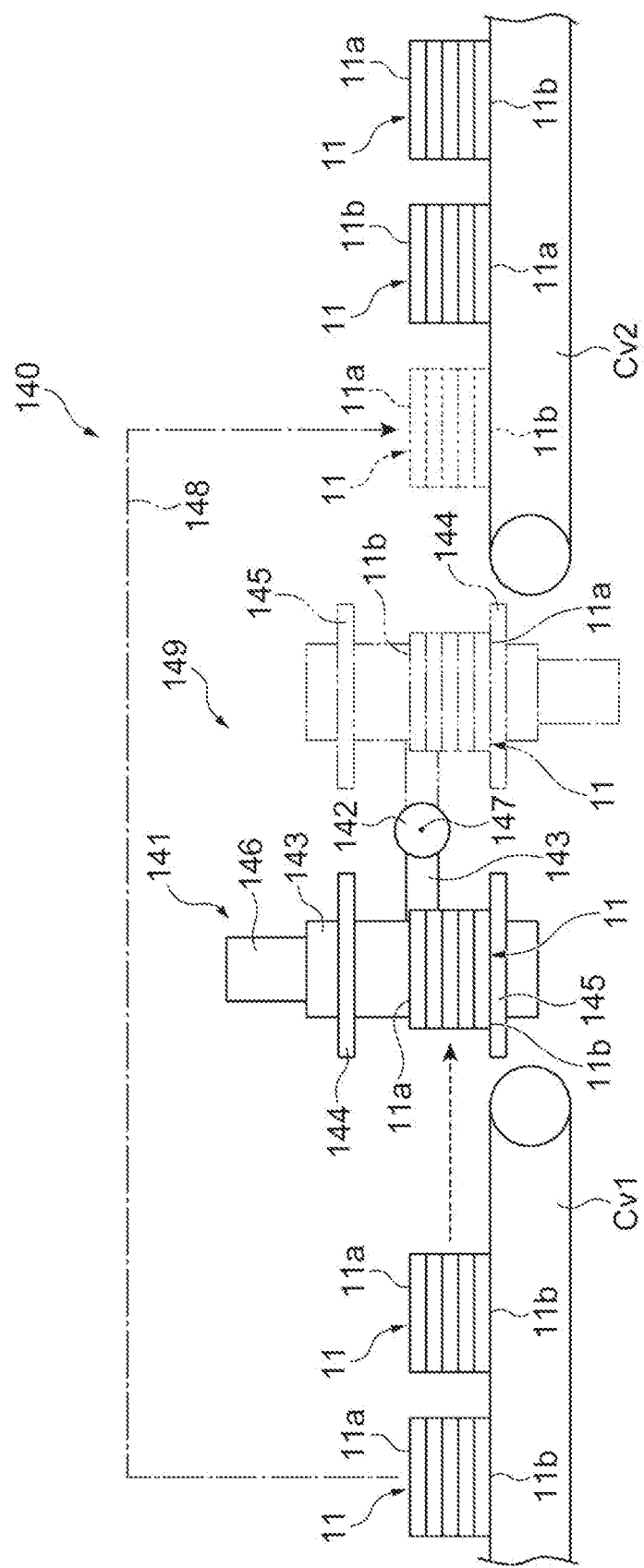
FIG. 5 is a schematic view illustrating an example turn-over device.

First, a configuration of a rotor 1 (core product) will be described with reference to FIG. 1 to FIG. 3. As illustrated in FIG. 1 to FIG. 3, the rotor 1 includes a shaft 2 and a stacked rotor core 3 (core product). The rotor 1 is combined with a stator, thereby forming a motor. The rotor 1 may be used for an interior permanent magnet (IPM) motor, for example.

The stacked rotor core 3 includes a pair of core blocks B1 and B2. The core block B1 (first core block) and the core block B2 (second core block) are assembled to the shaft 2 and stacked one on top of another (see FIG. 3). In the description regarding a configuration of the rotor 1 below, for convenience in description, terms "above" and "below" will be used with a circumstance, in which the center axis of the shaft 2 is disposed in the vertical direction and the core block B1 is disposed above with respect to the core block B2, being a standard.

As illustrated in FIG. 1 to FIG. 3, the core block B1 includes a stack 11 (first block body), a plurality of permanent magnets 12, a plurality of solidified resins 13 (first solidified resins), and an identification code 14 (first identification code). The stack 11 is cylindrical. The stack 11 includes an end surface 11*a* (first end surface) and an end surface 11*b* (second end surface). The end surface 11*a* and the end surface 11*b* may extend in a direction orthogonal to the center axis Ax. A shaft hole 11*c* (first shaft hole) is provided at the center of the stack 11 to pass through the stack 11 along the center axis Ax. The shaft hole 11*c* is open to the end surface 11*a* and the end surface 11*b*. The shaft hole 11*c* extends in the height direction (height direction) of the stack 11. The center axis Ax is also an axis of rotation because the stack 11 rotates around the center axis Ax. The shaft 2 is inserted in the shaft hole 11*c*. For example, the shaft 2 may be press-fitted into the shaft hole 11*c*.

A plurality of magnet insertion holes 15 are formed in the stack 11. The magnet insertion holes 15 are aligned along the outer circumference of the stack 11 at predetermined intervals, as illustrated in FIG. 1 and FIG. 2. Each of the magnet insertion holes 15 passes through the stack 11 along the center axis Ax, as illustrated in FIG. 3. The magnet insertion holes 15 are open to the end surface 11*a* and the end surface 11*b*. The magnet insertion holes 15 extend from the end surface 11*a* to the end surface 11*b* along the height direction.

Each of the magnet insertion holes 15 may have an elongated-hole shape extending along the outer circumference of the stack 11, for example. The number of magnet insertion holes 15 may be six, for example. The positions, shapes, and number of magnet insertion holes 15 may be changed depending on uses of the motor, required performances, and the like. The magnet insertion holes 15 may configure resin injection portions (first resin injection portions) because a resin is injected into the magnet insertion holes 15 as will be described later.

The stack 11 is formed by a plurality of blanked members W being stacked, as illustrated in FIG. 1 to FIG. 3. The blanked member W is a plate-shaped member made by an electrical steel sheet ES, which will be described later, being blanked into a predetermined shape. The shape of the blanked member W corresponds to the shape of the stack 11. The top surface of the blanked member W that is the top layer of the stack 11 corresponds to the end surface 11*a*, and the bottom surface of the blanked member W that is the bottom layer of the stack 11 corresponds to the end surface 11*b*. The stack 11 may be formed by what is called the rotational stack. This "rotational stack" refers to stacking the blanked members W while relatively deviating angles of the blanked members W from each other. The rotational stack is performed mainly for offsetting the thickness deviations of the blanked members W. The angle for the rotational stack may be set to any degree.

The blanked members W adjacent to each other in the height direction may be fastened by connecting tabs 16, as illustrated in FIG. 3. These blanked members W may be fastened by publicly known various methods instead of the connecting tabs 16. For example, the blanked members W may be bonded together by an adhesive or a resin material, or may be bonded together by welding. Alternatively, a temporarily-connecting tab may be provided on the blanked member W, the plurality of blanked members W may be fastened via the temporarily-connecting tab to obtain the stack 11, and then the temporarily-connecting tabs may be removed from the stack 11. The "temporarily-connecting tabs" means a connecting tab used to temporarily integrate the blanked members W and is removed in a process of manufacturing the product (core block B1).

In a process of blanking the electrical steel sheet ES to form the blanked members W by punching, a burr 18*a* (first burr) and a droop 18*b* may be formed at the circumferential edge of the shaft hole 11*c*, as illustrated in FIG. 3. The burr 18*a* is a portion of the bottom face of the blanked member W, where the portion protrudes in a direction from the end surface 11*a* to the end surface 11*b* as the portion approaches from an outer circumferential edge of the blanked member W to the shaft hole 11*c*. The droop 18*b* is a portion of the top face of the blanked member W, where the portion droops in a direction from the end surface 11*a* to the end surface 11*b* as the portion approaches from the outer circumferential edge of the blanked member W to the shaft hole 11*c*. As such, the circumferential edge of the shaft hole 11*c* of the stack 11 may be provided with the burr 18*a* protruding more than the end surface 11*b* toward the outside of the stack 11 and provided with the droop 18*b* leaning downward from than the end surface 11*a*. The amount of protrusion of the burr 18*a* from the end surface 11*b* may be approximately 0.01 mm to 0.10 mm, for example.

As illustrated in FIG. 2, two identification holes 19 are formed in the end surface 11*b* of the stack 11. The two identification holes 19 are marks indicating that the burr 18*a* is formed on the end surface 11*b*. No identification hole is formed on the end surface 11*a* of the stack 11. The two identification holes 19 may have the same shape. For example, the identification holes 19 may be holes passing through the blanked member W that is the bottom layer of the stack 11. The identification holes 19 may be holes open to only the bottom surface of the blanked member W that is the bottom layer of the stack 11. Alternatively, the identification holes 19 may be defined by through holes formed in the blanked members W including the blanked member W that is the bottom layer. The identification holes 19 may be formed at positions that do not affect a magnetic path generated when the rotor 1 is used. For example, the positions of the identification holes 19 may be located on the inner side than the magnet insertion holes 15 when viewed from the height direction. A single identification hole 19 may be formed in the bottom surface of the blanked member W that is the bottom layer, or three or more identification holes 19 may be formed in the bottom surface of the blanked member W that is the bottom layer.

As illustrated in FIG. 1 to FIG. 3, each of the permanent magnets 12 is inserted in the corresponding magnet insertion hole 15. The shape of the permanent magnet 12 may be, but not limited to, a rectangular parallelepiped, for example. The kind of permanent magnet 12 should be determined depending on uses of the motor, required performances, and the like. For example, the kind of permanent magnet 12 may be a sintered magnet or a bonded magnet.

The solidified resins 13 are each provided in the magnet insertion holes 15. The solidified resin 13 is made by filling a resin material in a molten state (molten resin) into the magnet insertion hole 15, into which the permanent magnet 12 has been inserted, and thereafter solidifying the filled resin material. The solidified resin 13 may be configured to fix the permanent magnet 12 in the magnet insertion hole 15 and may be configured to bond the blanked members W adjacent to each other in the height direction (a direction extending from the end surface 11*b* to the end surface 11*a*). Examples of the resin material of the solidified resin 13 include a thermosetting resin and a thermoplastic resin. Examples of thermosetting resin include a resin composition including an epoxy resin, a curing initiator, and an additive. Examples of the additive include a filler, a flame retardant, and a stress reducing agent.

The top surface of the solidified resin 13 is exposed from the magnet insertion hole 15 when viewed from above. For example, in the height direction, the position of the top surface of the solidified resin 13 may be substantially the same as the position of the end surface 11*a*, may be lower than the position of the end surface 11*a*, or may be higher than the position of the end surface 11*a*. The bottom surface of the solidified resin 13 is exposed from the magnet insertion hole 15 when viewed from below. For example, in the height direction, the position of the bottom surface of the solidified resin 13 may be substantially the same as the position of the end surface 11*b*, may be higher than the position of the end surface 11*b*, or may be lower than the position of the end surface 11*b*.

As illustrated in FIG. 1 and FIG. 3, a gate mark 17 (first gate mark) is formed on the top surface of each of the solidified resins 13. The gate mark 17 protrudes outward more than the end surface 11*a*. The core block B1 includes the gate marks 17 only on the top surfaces of the solidified resins 13. As such, the core block B1 includes the gate marks 17 integrated with the top surfaces of the solidified resins 13 and protruding from the end surface 11a toward the outside of the stack 11. For example, the gate mark 17 in the core block B1 may continuously extend from the solidified resin 13. The height of the core block B1 may be substantially the same as the total height of the stack 11 and the gate mark 17. The gate mark 17 is formed of the same material as the solidified resin 13. The height of the gate mark 17 (the amount of protrusion of the gate mark 17 from the end surface 11a) may be greater than the amount of protrusion of the burr 18a. The height of the gate mark 17 may be approximately 10 times greater than the amount of protrusion of the burr 18a. For example, the height of the gate mark 17 may be approximately 0.1 mm to 1.0 mm. As illustrated in FIG. 2, no gate marks are formed on the bottom surfaces of the solidified resins 13. In the example illustrated in FIG. 1, part of the gate mark 17 overlaps the top surface of the solidified resin 13 when viewed from above. However, the entire gate mark 17 may overlap the top surface of the solidified resin 13 when viewed from above.

As illustrated in FIG. 2, the identification code 14 is provided on the end surface 11b of the stack 11. The identification code 14 may be provided on an outer end surface of the blanked member W that is the bottom layer of the stack 11. The identification code 14 may be configured to store individual information used for identifying an individual (for example, a kind, a manufactured date and time, a used material, a manufacturing line, etc.) of the core block B1 including the identification code 14. The identification code 14 is not limited to a particular code as long as it is capable of storing the individual information with a combination of light and dark patterns. For example, the identification code 14 may be a bar code or a two-dimensional code. Examples of the two-dimensional code include a QR code (registered trademark), DataMatrix, and Vericode. As illustrated in FIG. 2, the identification code 14 may have a pattern made by a combination of a white background and black markings.

The core block B2 is formed in the same manner as the core block B1 except for some parts. The core block B2 includes the stack 11 (second block body), the permanent magnets 12, the solidified resins 13 (second solidified resins), and the identification code 14 (second identification code). The stack 11 of the core block B2 includes the end surface 11a (third end surface) and the end surface 11b (fourth end surface). The shaft hole 11c (second shaft hole) extending along the center axis Ax is provided in the stack 11 of the core block B2. The plurality of magnet insertion holes 15 (second resin injection portions) extending along the center axis Ax are formed in the stack 11 of the core block B2.

As illustrated in FIG. 2 and FIG. 3, the gate marks 17 (second gate marks) are formed on the solidified resins 13 of the core block B2, as with the core block B1. However, the gate marks 17 of the core block B2 and the gate marks 17 of the core block B1 are formed in different places. The gate marks 17 in the core block B2 are formed on the bottom surfaces of the solidified resins 13 and protrude more than the end surface 11b. The core block B2 may include the gate marks 17 integrated with the bottom surfaces of the solidified resins 13 and protruding more than the end surface 11b toward the outside of the stack 11. For example, the gate mark 17 in the core block B2 may continuously extend from the solidified resin 13. The core block B2 includes the gate marks 17 only on the bottom surfaces of the solidified resins 13.

The identification code 14 of the core block B2 is formed in the same manner as the identification code 14 of the core block B1. However, the identification code 14 of the core block B2 and the identification code 14 of the core block B1 are formed in different places. The identification code 14 of the core block B2 is provided on the end surface 11a of the stack 11. The identification code 14 of the core block B2 may be provided on an outer end surface of the blanked member W that is the top layer of the stack 11. The identification code 14 of the core block B2 may be configured to store individual information used for identifying an individual (for example, a kind, a manufactured date and time, a used material, a manufacturing line, etc.) of the core block B2 including the identification code 14.

In a state in which the stack 11 of the core block B1 and the stack 11 of the core block B2 are assembled to the shaft 2, the stack 11 of the core block B2 is disposed under the stack 11 of the core block B1. The end surface 11b of the stack 11 in the core block B1 faces the end surface 11a of the stack 11 in the core block B2 such that the end surfaces 11b and 11a face inward. There are no gate marks that protrude more than the end surface 11b toward the end surface 11a between the end surface 11b and the end surface 11a facing each other. There are no gate marks that protrude more than the end surface 11a toward the end surface 11b between the end surface 11b and the end surface 11a facing each other. The end surface 11b including the identification codes 14 in the core block B1 and the end surface 11a including the identification code 14 in the core block B2 are facing each other. The burr 18a of the stack 11 in the core block B1 is accommodated in a space formed by the droop 18b of the stack 11 in the core block B2 between the end surface 11b and the end surface 11a facing each other.

The end surface 11a of the stack 11 in the core block B1 and the end surface 11b of the stack 11 in the core block B2 are disposed such that the end surfaces 11a and 11b face outward. The gate marks 17 of the core blocks B1 and B2 are provided so as to protrude outward more than the end surface 11a and the end surface 11b facing outward, respectively.

Apparatus for Manufacturing Rotor

With reference to FIG. 4 to FIG. 8, a manufacturing apparatus 100 for manufacturing the rotor 1 will now be described.

The manufacturing apparatus 100 is an apparatus for manufacturing the rotor 1 (core blocks B1 and B2) from an electrical steel sheet ES (workpiece plate) that is a belt-shaped metal sheet. The manufacturing apparatus 100 includes an uncoiler 110, a feeding device 120, a blanking device 130, a turnover device 140, a providing device 150, a resin injection device 160, and a controller Ctr (control unit).

The uncoiler 110 rotatably holds a coil material 111 that is a belt-shaped electrical steel sheet ES wound in the form of a coil, in a state in which the coil material 111 is installed. The feeding device 120 includes a pair of rollers 121 and 122 that sandwich the electrical steel sheet ES from above and below. The pair of rollers 121 and 122 rotate and stop in accordance with an instruction signal from the controller Ctr, and successively feed the electrical steel sheet ES intermittently to the blanking device 130.

The blanking device 130 operates in accordance with an instruction signal from the controller Ctr. The blanking device 130 is configured to blank the electrical steel sheet ES by a punch and a die. The blanking device 130 is configured to successively blank the electrical steel sheet ES intermittently fed by the feeding device 120 in order to form the blanked members W. The blanking device 130 is configured to successively stack the blanked members W formed by blanking in order to manufacture the stack 11.

The stack 11 is ejected from the blanking device 130 and thereafter placed on a conveyor Cv1 provided so as to extend between the blanking device 130 and the turnover device 140. The stack 11 is placed on the conveyor Cv1 such that its end surface 11b contacts the conveyor Cv1. The end surface 11a faces up and the end surface 11b faces down in the stack 11 placed on the conveyor Cv1. The conveyor Cv1 operates in accordance with an instruction signal from the controller Ctr and sends the stack 11 to the turnover device 140.

The turnover device 140 operates in accordance with an instruction signal from the controller Ctr. The turnover device 140 is configured to turn over some of a plurality of the stacks 11 manufactured by the blanking device 130. For example, the turnover device 140 may turn over every second stack 11 of the plurality of stacks 11 successively sent to the turnover device 140. As exemplified in FIG. 5, the turnover device 140 includes a transfer unit 148 and a turnover unit 149.

The transfer unit 148 is configured to transfer the stack 11 from the conveyor Cv1 to the conveyor Cv2 without changing the up-and-down direction of the stack 11 (without the stack 11 passing through the turnover unit 149). For example, when the end surface 11b of the stack 11 contacts the conveyor Cv1, the end surface 11b of the stack 11 also contacts the conveyor Cv2 after being transferred to the conveyor Cv2 by the transfer unit 148.

The turnover unit 149 is configured to transfer the stack 11 from the conveyor Cv1 to the conveyor Cv2, changing the up-and-down direction of the stack 11 (turning over the stack 11). For example, when the end surface 11b of the stack 11 contacts the conveyor Cv1, the end surface 11b faces up and the end surface 11a faces down after the stack 11 is transferred to the conveyor Cv2 through the turnover unit 149. Consequently, the end surface 11a of the stack 11 contacts the conveyor Cv2. The turnover unit 149 includes a hold unit 141, a turnover actuator 142, a carrying-in device (not illustrated), and a carrying-out device (not illustrated).

The hold unit 141 holds the stack 11 carried in from the conveyor Cv1. The hold unit 141 includes a base 143, two holders 144 and 145 provided to the base 143, and a hold actuator 146. The two holders 144 and 145 hold the stack 11 from above and below, the stack 11 carried in with the end surface 11b facing down. The hold actuator 146 changes the distance between the holders 144 and 145 so as to switch between the state in which the holders 144 and 145 hold the stack 11 and the state in which the holders 144 and 145 release the stack 11. For example, the hold actuator 146 elevates the holder 145 using an air cylinder or the like as a power source, while remaining the position of the holder 144 fixed.

The turnover actuator 142 is configured to turn over the base 143 around an axis 147 orthogonal to both a transfer direction of the stack 11 on the conveyor Cv1 and a vertical direction. The holders 144 and 145 are turned over as a result of the operation of turning over the base 143. Accordingly, the end surface 11a of the stack 11 faces down and the end surface 11b of the stack 11 faces up.

The bring-in device is provided to an end of the conveyor Cv1. The bring-in device is driven by, for example, an electric linear actuator or an electric cylinder as a power source. The bring-in device is configured to push a target stack 11 to be turned over into the turnover unit 149 in accordance with an instruction signal from the controller Ctr. The bring-out device is configured to send the stack 11 that has been turned over to the conveyor Cv2. For example, the bring-out device is provided to the holder 144, and is configured to push the stack 11 out of the space between the holders 144 and 145 to the conveyor Cv2 using a linear actuator or a cylinder as a power source.

The conveyor Cv2 operates in accordance with an instruction signal from the controller Ctr and transfers the stack 11 that has not been turned over and the stack 11 that has been turned over to the providing device 150.

Referring back to FIG. 4, the providing device 150 operates in accordance with an instruction signal from the controller Ctr. The providing device 150 is configured to provide the identification code 14 to the stack 11. For example, in order to distinguish the stack 11 that has not been turned over as a kind that differs from the stack 11 that has been turned over, the providing device 150 may provide the identification codes 14 and 14 including different individual information (kind information) to the stack 11 that has not been turned over and the stack 11 that has been turned over. The providing device 150 includes a laser device 151. The laser device 151 is configured to irradiate the stack 11 with a laser beam in accordance with an instruction signal from the controller Ctr when the stack 11 being conveyed by the conveyor Cv2 passes below the laser device 151. The laser device 151 irradiates the end surface 11a of the stack 11 that has not been turned over with a laser beam, thereby forming the identification code 14 on the end surface 11a of that stack 11. The laser device 151 irradiates the end surface 11b of the stack 11 that has been turned over with a laser beam, thereby forming the identification code 14 on the end surface 11b of that stack 11.

Figure 6:
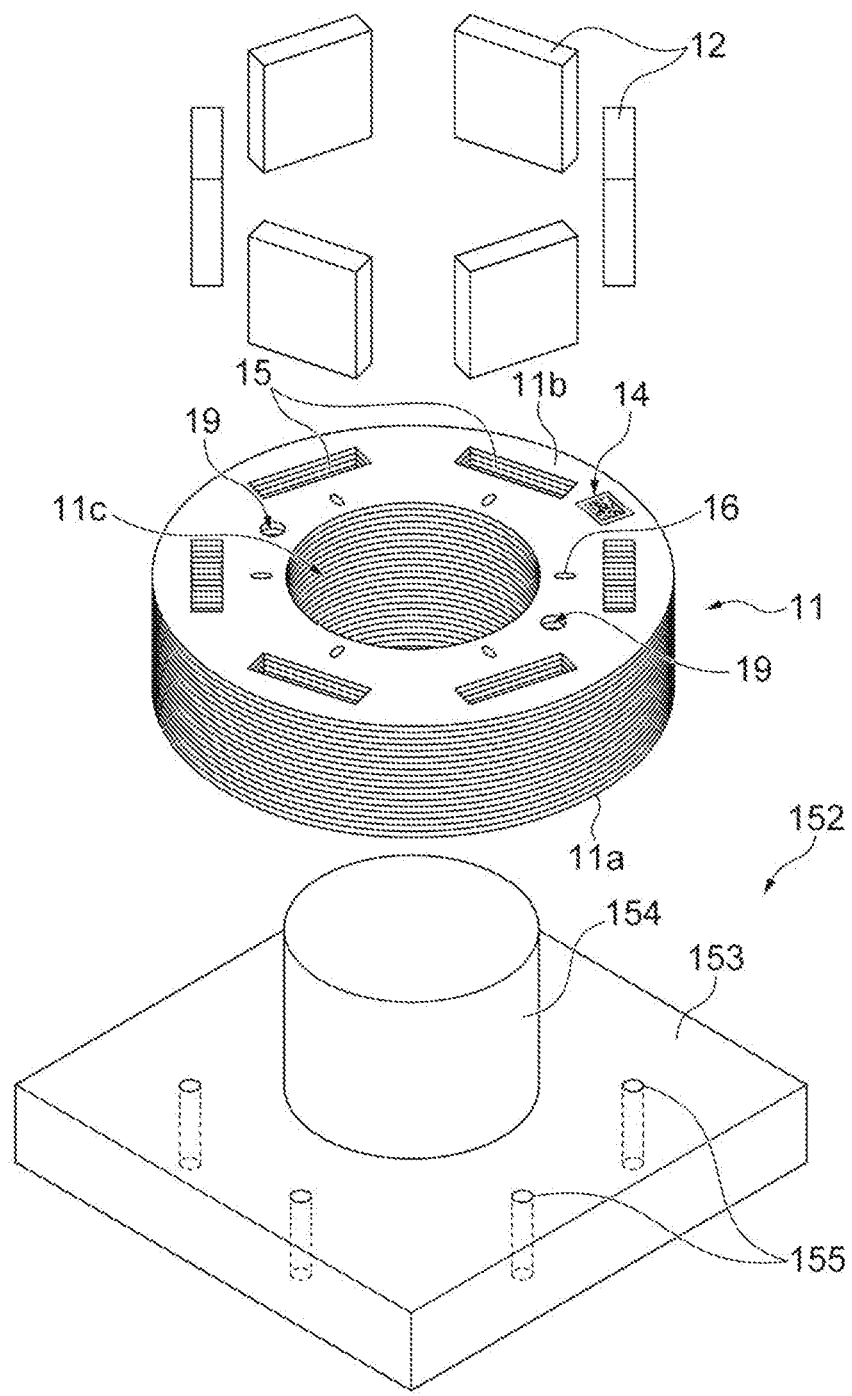
FIG. 6 is a perspective view for describing a state in which permanent magnets are mounted to magnet insertion holes of a stack.

The stack 11 provided with the identification code 14 by the providing device 150 is placed on the conveyor Cv3 through a jig attachment device (not illustrated). The jig attachment device is configured to attach the stack 11 to a jig 152 described later. As illustrated in FIG. 6, the jig 152 includes a transfer plate 153 and a post 154. The transfer plate 153 is a plate-shaped member made of metal and is configured such that the stack 11 can be placed thereon. The post 154 is a columnar member made of metal and extends substantially vertically upward from the top face of the transfer plate 153. The post 154 is fixed to the transfer plate 153. The outer diameter of the post 154 may be substantially the same as the inner diameter of the shaft hole 11c. In the transfer plate 153, a plurality of (here, six) gate holes 155 are formed. The gate holes 155 pass through the transfer plate 153 in the thickness direction. Each of the gate holes 155 is provided at a position corresponding to the magnet insertion hole 15 of the stack 11.

Figure 7:
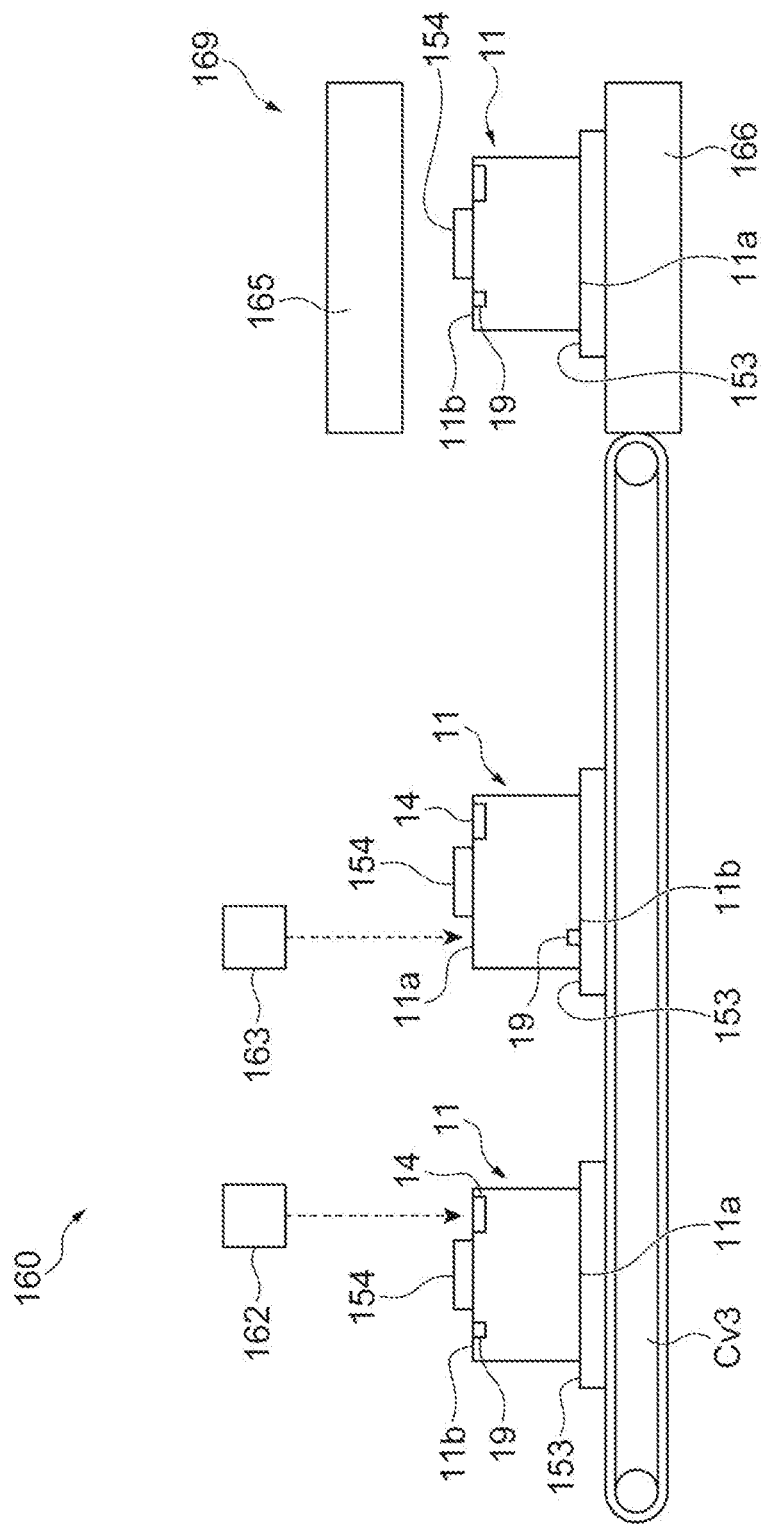
FIG. 7 is a schematic view illustrating an example resin injection device.

The resin injection device 160 operates in accordance with an instruction signal from the controller Ctr. The resin injection device 160 is configured to insert each of the permanent magnets 12 into the corresponding magnet insertion hole 15, and inspect an insertion state of the permanent magnets 12 and a resin injection direction. The resin injection device 160 is configured to preheat the stack 11 before filling a resin, and fill a molten resin into the magnet insertion holes 15, to which the permanent magnets 12 have been inserted. As illustrated in FIG. 7, the resin injection device 160 includes a camera 162, a laser device 163, and a resin insertion unit 169. The camera 162 and the laser device 163 are positioned above the conveyor Cv3.

The camera 162 operates in accordance with an instruction signal from the controller Ctr. The camera 162 is configured to image the identification code 14 when the stack 11 being conveyed by the conveyor Cv3 passes below the camera 162. The camera 162 outputs image data acquired by imaging the identification code 14 to the controller Ctr. The camera 162 may include a light source (for example, a flash light source). In this case, the camera 162 may irradiate, with light, either one facing up of the end surface 11b and the end surface 11a of the stack 11, when imaging the identification code 14.

The laser device 163 operates in accordance with an instruction signal from the controller Ctr. The laser device 163 is configured to irradiate the magnet insertion holes 15 with laser light, and irradiate the position where the identification hole 19 is formed with laser light. The laser device 163 is configured to receive reflected light of the radiated laser light, when the stack 11 being conveyed by the conveyor Cv3 passes the laser device 163. The laser device 163 radiates laser light at the timing (light radiation timing) for starting to radiate laser light instructed by the controller Ctr, for example. When receiving laser light, the laser device 163 outputs a light-receiving signal indicating that the laser light has been received to the controller Ctr.

Figure 8:
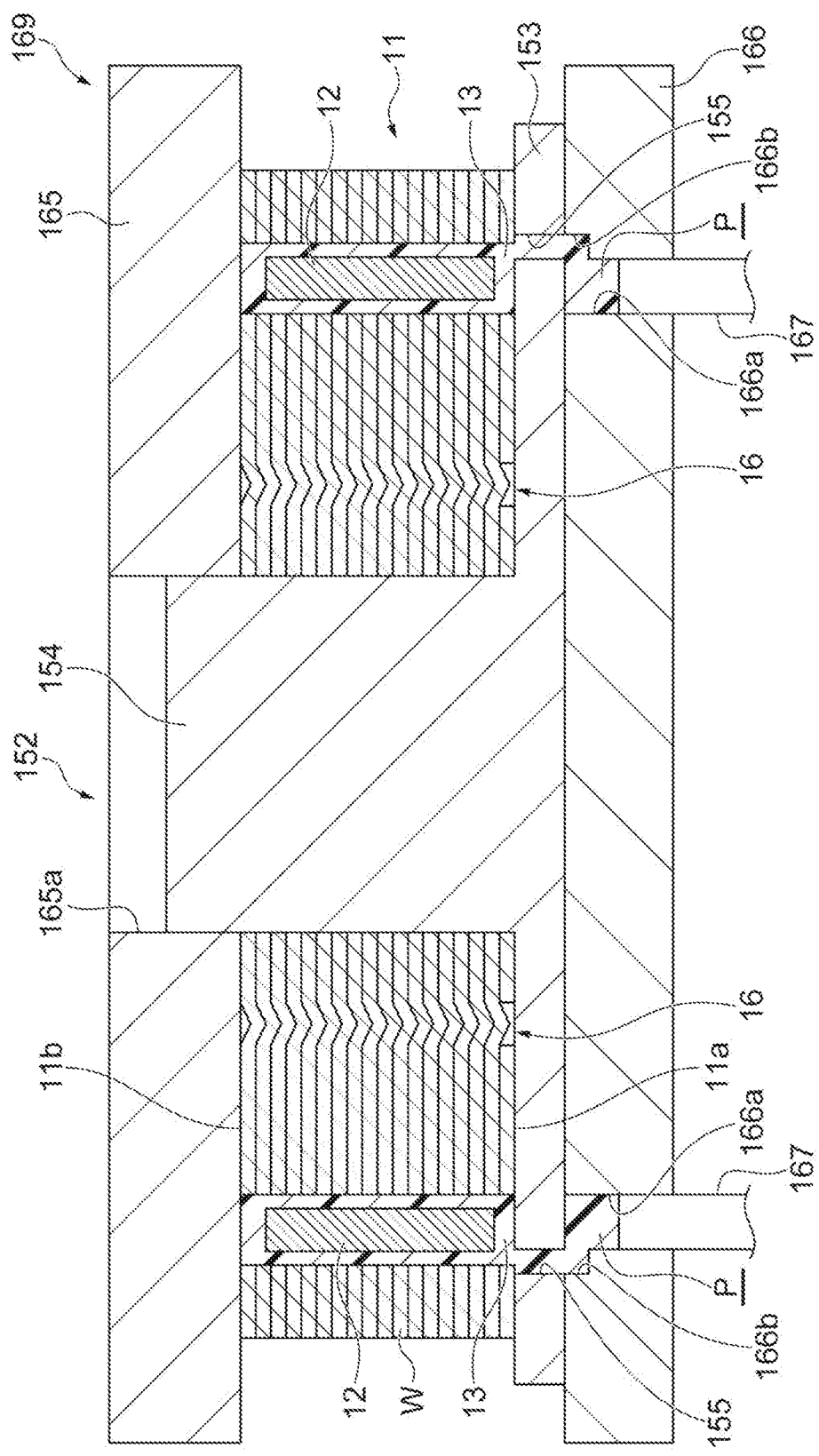
FIG. 8 is a schematic sectional view for describing a state in which a molten resin is filled into the magnet insertion holes of the stack by the resin injection device.

As illustrated in FIG. 8 in detail, the resin insertion unit 169 includes an upper mold 165, a lower mold 166, and a plurality of plungers 167. The upper mold 165 and the lower mold 166 are configured to be capable of sandwiching the stack 11 in the height direction in conjunction with the transfer plate 153 of the jig 152. When the stack 11 is sandwiched between the upper mold 165, and the transfer plate 153 and the lower mold 166, a certain load is applied to the stack 11 in the height direction.

The upper mold 165 is a plate-shaped member having a rectangular shape. In the upper mold 165, a through hole 165a is provided substantially at the center of the upper mold 165. The through hole 165a has a shape corresponding to the shape of the post 154 of the jig 152 (substantially a circular shape), and the post 154 can be inserted into the through hole 165a.

The lower mold 166 is a plate-shaped member having a rectangular shape. In the lower mold 166, a plurality of accommodation holes 166a and a plurality of gate portions 166b are provided. The accommodation holes 166a pass through the lower mold 166 in the thickness direction. Each of the accommodation holes 166a is positioned at a place corresponding to the magnet insertion hole 15 of the stack 11 in a state in which the upper mold 165 and the lower mold 166 sandwich the stack 11 (sandwich state). Each of the accommodation holes 166a is columnar and has the function of accommodating at least one resin pellet P. The gate portions 166b are each connected to the accommodation holes 166a. In the sandwich state, each of the gate portions 166b is positioned at a place corresponding to the gate hole 155 formed in the transfer plate 153. In the sandwich state, the size (area) of the gate portion 166b is substantially the same as the size (area) of the gate hole 155, when viewed in the thickness direction (from below) of the transfer plate 153.

The plungers 167 are positioned below the lower mold 166. Each of the plungers 167 is configured to be insertable into and removable from the corresponding accommodation hole 166a by a power source (not illustrated). As heat sources, built-in heat sources (not illustrated) are provided in the upper mold 165 and the lower mold 166. The built-in heat sources are heaters built in each of the upper mold 165 and the lower mold 166, for example. When the built-in heat sources operate, the stack 11 and the jig 152 are heated through the upper mold 165 and the lower mold 166, and the resin pellet P accommodated in each of the accommodation holes 166a is heated. Thus, the resin pellet P melts and changes to a molten resin.

The controller Ctr generates instruction signals to operate each of the feeding device 120, the blanking device 130, the turnover device 140, the providing device 150, and the resin injection device 160, on the basis of an operation input from a computer program recorded in a record media or from an operator, for example, and transmits the instruction signals to each of the devices.

The controller Ctr receives image data output from the camera 162 and processes the received image data to identify information recorded in the identification code 14. For example, the controller Ctr identifies (obtains) kind information on a kind recorded in the identification code 14, whereby the controller Ctr recognizes the kind of the stack 11 to be inspected.

The controller Ctr causes the laser device 163 to irradiate the magnet insertion holes 15 with laser light at a predetermined light radiation timing. The controller Ctr receives a light-receiving signal of the laser light radiated to the magnet insertion holes 15, and calculates the timing at which the light-receiving signal was received as a light receiving timing, for example. The controller Ctr calculates the distance from the laser device 163 to a reflection position of the laser light based on the difference between the light radiation timing and the light receiving timing, thereby inspecting the existence or non-existence of the permanent magnet 12 and the disposed position of the permanent magnet 12, for example.

The controller Ctr causes the laser device 163 to irradiate the position where the identification hole 19 are formed with laser light. The controller Ctr inspects the existence or non-existence of the identification hole 19 based on the distance from the laser device 163 to a reflection position of the laser light, in the same manner as the inspection of the permanent magnets 12. In the stack 11 that has not been turned over, when the placing state of that stack 11 is correct, the end surface 11b, to which the identification holes 19 are provided, should face down, and hence the controller Ctr does not detect the identification holes 19. On the other hand, in the stack 11 that has been turned over, when the placing state of that stack 11 is correct, the end surface 11b, to which the identification holes 19 are provided, should face up, and hence, the controller Ctr detects the identification hole 19. The controller Ctr determines whether the placing state of the stack 11 is correct on the basis of the detection result of the identification holes 19 and the kind information read through the camera 162.

Method of Manufacturing Rotor

With reference to FIG. 4 to FIG. 8, a method of manufacturing the rotor 1 will now be described. The controller Ctr first provides an instruction to the blanking device 130, causing the blanking device 130 to successively blank the electrical steel sheet ES and stack blanked members W in order to form the stack 11. The stack 11 formed by the blanking device 130 is placed on the conveyor Cv1 such that the end surface 11b contacts the conveyor Cv1.

The controller Ctr then provides an instruction to the conveyor Cv1, causing the conveyor Cv1 to successively transfer a plurality of the stacks 11 to the turnover device 140. The controller Ctr then provides an instruction to the turnover device 140, causing the turnover device 140 to turn over some of the stacks 11. For example, the turnover device 140 places, on the conveyor Cv2, the stacks 11 that are not to be turned over out of the stacks 11, such that the end surface 11*b* contacts the conveyor Cv2. The turnover device 140 also places, on the conveyor Cv2, the stacks 11 that are to be turned over out of the stacks 11, such that the end surface 11*a* contacts the conveyor Cv2.

The controller Ctr then provides an instruction to the conveyor Cv2, causing the conveyor Cv2 to transfer the stack 11 to the providing device 150. The controller Ctr then provides an instruction to the providing device 150, causing the providing device 150 to provide the identification code 14 to each of the stacks 11. For example, the laser device 151 of the providing device 150 irradiates the end surface 11*b*, which faces up, of the stack 11 that has been turned over with a laser beam, thereby forming the identification code 14 on that end surface 11*b*. The laser device 151 also irradiates the end surface 11*a*, which faces up, of the stack 11 that has not been turned over with a laser beam, thereby forming the identification code 14 on that end surface 11*a*.

The controller Ctr then provides an instruction to the jig attachment device, causing the jig attachment device to attach the stack 11 to the jig 152. Alternatively, the stack 11 may be attached to the jig 152 by an operator instead of the jig attachment device. For example, in a state in which the jig 152 is placed on a placing base, the stack 11 positioned on a downstream end side of the conveyor Cv2 is attached to the jig 152. For example, in the case of the stack 11 that has been turned over, the stack 11 is placed on the transfer plate 153 such that the post 154 fits into the shaft hole 11*c* and the end surface 11*a* contacts the transfer plate 153. In the case of the stack 11 that has not been turned over, the stack 11 is placed on the transfer plate 153 such that the post 154 fits into the shaft hole 11*c* and the end surface 11*b* contacts the transfer plate 153.

The stack 11 attached to the jig 152 is then transferred to the resin injection device 160, and each of the permanent magnets 12 is inserted into the corresponding magnet insertion hole 15 as illustrated in FIG. 6. The insertion of each of the permanent magnets 12 into the corresponding magnet insertion hole 15 may be performed manually, or may be performed by, for example, a robot hand (not illustrated) of the resin injection device 160 in accordance with an instruction signal from the controller Ctr. FIG. 6 illustrates how to insert the permanent magnets 12 into the magnet insertion holes 15 of the stack 11 that has been turned over.

The controller Ctr then provides an instruction to the camera 162 and the laser device 163 in order to determine whether the posture (placing state) of the stack 11 is correct. The controller Ctr determines whether the end surface 11*a* and the end surface 11*b* of the stack 11 to be inspected faces up or down, for the posture of the stack 11. For example, the controller Ctr determines which of the end surface 11*a* and the end surface 11*b* of the stack 11 faces up. First, the identification code 14 formed on the stack 11 is read through the camera 162. Kind information on a kind recorded in the identification code 14 is identified (obtained), and the correct posture of the stack 11 to be inspected is determined.

Subsequently, the laser device 163 radiates laser light to the magnet insertion holes 15, and the existence or nonexistence of the permanent magnets 12 and the disposed position of the permanent magnet 12 are inspected. If no permanent magnet 12 exists in the magnet insertion hole 15 or if the disposed position of the permanent magnet 12 is incorrect, the controller Ctr determines the stack 11 to be inspected is nonconforming Following the inspection of the permanent magnets 12, the laser device 163 radiates laser light to the positions where the identification holes 19 are formed, and the existence or non-existence of the identification holes 19 is detected. The controller Ctr determines whether the posture of the stack 11 is correct on the basis of the detection result of the identification holes 19 and the kind information read through the camera 162. For example, the controller Ctr determines that the stack 11 to be inspected is nonconforming, in the case where the kind information read through the camera 162 indicates that in the correct state the end surface 11*b* should face up, but no identification holes were detected. The stack 11 to be inspected that has been determined to be nonconforming is excluded from the manufacturing line.

On the other hand, the stack 11 determined to be conforming as a result of the determination is transferred to the resin insertion unit 169. As illustrated in FIG. 8, the upper mold 165 is disposed above and the lower mold 166 is disposed below the stack 11 in a state of being attached to the jig 152. Thereafter, the stack 11 is sandwiched between the upper mold 165 and the lower mold 166 in the height direction with the jig 152 interposed therebetween, and whereby the stack 11 is compressed with a certain load. The resin pellet P is then put into each of the accommodation holes 166*a*. When the built-in heat sources of the upper mold 165 and the lower mold 166 are activated and the resin pellets P melt, a molten resin is injected into each of the magnet insertion holes 15 through the gate portions 166*b* and the gate holes 155 by the plungers 167. The molten resin is injected from below (from the end surface 11*a* side to the end surface 11*b* side) into the magnet insertion holes 15 of the stack 11 that has been turned over in order to form the solidified resins 13 in the magnet insertion holes 15, as illustrated in FIG. 8. Also in the stack 11 that has not been turned over, the molten resin is injected into the magnet insertion holes 15 from below (from the end surface 11*b* side to the end surface 11*a* side) in order to form the solidified resins 13 in the magnet insertion holes 15. Thereafter, when the molten resin solidifies, the solidified resins 13 are formed in the magnet insertion holes 15. It should be noted that the stack 11 may be preheated by a non-illustrated heating device before being disposed in the resin insertion unit 169. Alternatively, the stack 11 may be preheated by the resin insertion unit 169 before the molten resin is injected. In this manner, the permanent magnets 12 are attached to the stack 11 together with the solidified resins 13. The upper mold 165, and the jig 152 and the lower mold 166 are detached from the stack 11. Thus, the core blocks B1 and B2 are formed.

When the upper mold 165, and the jig 152 and the lower mold 166 are detached from the stack 11, the solidified resin in the gate hole 155 breaks. Hence, part of the solidified resin in the gate hole 155 remains in the stack 11 in a state of being integrated with the solidified resin 13. In the stack 11 that has been turned over, the part of the solidified resin remaining in the stack 11 forms the gate mark 17 protruding outward more than the end surface 11*a*. In the stack 11 that has not been turned over, the part of the solidified resin remaining in the stack 11 forms the gate mark 17 protruding outward more than the end surface 11*b*. In this example, the stack 11 that has been turned over constitutes the core block B1 and the stack 11 that has not been turned over constitutes the core block B2.

The core blocks B1 and B2 are then transferred to a shaft attachment device (not illustrated). Then, the shaft 2 is inserted into the shaft hole 11*c* of the core block B1 and the shaft hole 11*c* of the core block B2, and whereby the shaft 2 is assembled to the core blocks B1 and B2. The shaft 2 is inserted (press-fitted) such that the insertion direction of the shaft 2 coincides with the protruding direction of the burr

18*a*. The shaft 2 is inserted into the shaft hole 11*c* in the protruding direction of the burr 18*a* formed in the stack 11.

For example, the shaft 2 may be inserted into the shaft holes 11*c*, in a state in which the core block B1 and the core block B2 are stacked such that the end surface 11*b* of the stack 11 in the core block B1 faces the end surface 11*a* of the stack 11 in the core block B2. In this case, the shaft 2 is inserted into the shaft holes 11*c* from the side of the end surface 11*a* of the stack 11 in the core block B1 to the side of the end surface 11*b* of the stack 11 in the core block B2 such that the insertion direction coincides with the protruding direction of the burr 18*a*.

For example, the core block B1 may be assembled to the shaft 2 and thereafter the core block B2 may be assembled to the shaft 2. In this case, the shaft 2 is first inserted into the shaft hole 11*c* of the core block B1 from the side of the end surface 11*a* to the side of the end surface 11*b* of the stack 11 in the core block B1 such that the insertion direction coincides with the protruding direction of the burr 18*a*. Thereafter, the shaft 2 is inserted into the shaft hole 11*c* of the core block B2 from the side of the end surface 11*a* to the side of the end surface 11*b* of the stack 11 in the core block B2 such that the insertion direction coincides with the protruding direction of the burr 18*a*. Thus, the rotor 1 including the core blocks B1 and B2 is formed.

In some examples, one stacked rotor core 3 is formed by stacking the core block B1 and the core block B2, and thus the stacked rotor core 3 having a relatively large size can be obtained. Consequently, when the rotor 1 is formed with the stacked rotor core 3, the rotor 1 having large output can be obtained.

In some examples, the stacked rotor core 3 is formed by injecting a resin into each of the two stacks 11 in order to form the core blocks B1 and B2 and thereafter stacking the core blocks B1 and B2. Because of this configuration, a molten resin is filled into the magnet insertion holes 15 having a shorter length, as compared with a case where a resin is injected into magnet insertion holes provided in a stack of the same size as the stacked rotor core 3. For this reason, appearance of unfilled space in the magnet insertion hole 15 is reduced or eliminated. The resin filled into the magnet insertion hole 15 as the resin injection portion can therefore be uniform.

If the gate marks of one stack face the other stack, these gate marks may come into contact with the other stack and result in dents. In this case, a magnetic flow may change in the vicinity of the dents, which may affect output performance of the rotor 1. Moreover, in this case, when the stacks are stacked, a gap may be made between the stacks, so that the gate marks may come off the solidified resins. The removed resins may fall in an air gap between the rotor (core) and the stator (tooth portions). In order to prevent dents from being caused by the gate marks, an intermediate plate may be placed between the stacks. For example, stacking the stacks with an intermediate plate, which has grooves at positions where the gate marks are to be formed, interposed therebetween prevents the above-described dents from being caused by the gate marks.

In some examples, the gate marks 17 are provide on the top surfaces of the solidified resins 13, and protrude more than the end surface 11*a* of the stack 11 in the core block B1 toward the outside of the stack 11. In some examples, the gate marks 17 are provided to the bottom surfaces of the solidified resins 13, and protrude more than the end surface 11*b* of the stack 11 in the core block B2 toward the outside of the stack 11. In some examples, the stacks 11 are stacked such that the end surface 11*b* and the end surface 11*a* from both of which no gate marks protrude face each other. Hence, dents are not formed by the gate marks on the end surfaces even without an intermediate plate. In addition, the possibility of the removed resins falling off into the above-described air gap is reduced.

In some examples, the shaft 2 inserted in the shaft hole 11*c* is provided. The core block B1 and the core block B2 are stacked in a state in which the shaft 2 is inserted in each of the shaft holes. Hence, the stack state of the core block B1 and the core block B2 can be maintained more reliably.

In some examples, the circumferential edges of the shaft holes 11*c* of both of the core blocks B1 and B2 are provided with the burrs 18*a* protruding in the same direction. The shaft 2 is inserted into the shaft holes 11*c* such that the insertion direction of the shaft 2 coincides with the protruding direction of the burrs 18*a*. This configuration prevents the shaft 2 from coming into collision with the burrs when the shaft 2 is inserted, and prevents the burrs from falling off to generate a foreign body into the motor, as compared with a case where the shaft 2 is inserted in a direction opposite to the above-described protruding direction.

In some examples, the identification holes 19 are provided in the end surfaces 11*b* of the core blocks B1 and B2. The posture of the stack 11 can be identified by, for example, irradiating the positions where the identification holes 19 are formed with laser light in order to detect whether or not the identification holes 19 exist. For example, it can be detected which of the end surface 11*a* and the end surface 11*b* of the stack 11 faces up.

In some examples, the identification codes 14 and 14 are formed on the end surface 11*b* in the core blocks B1 and the end surface 11*a* in the core blocks B2, these end surfaces 11*b*, 11*a* facing each other. For example, in the process of manufacturing the core blocks B1 and B2, when a molten resin is injected into the magnet insertion holes 15 from below, the stacks 11 of the core blocks B1 and B2 may be transferred in a state in which both of the identification codes 14 and 14 face up. This can simplify a configuration for reading individual information from the identification code 14 when the injection direction of a resin is inspected using information of the identification code 14 in addition to the identification result of the posture of the stack 11. Moreover, it can be checked whether the injection direction of the resin with respect to the stack 11 is correct, by a comparison of the kinds of the core blocks B1 and B2, which are identified from the identification codes 14 and 14, with the posture of the stack 11 (the existence or non-existence of the identification holes 19). This prevents the gate marks from being formed on the end surface 11*b* or the end surface 11*a* facing each other in a state in which the stacks 11 and 11 are stacked.

In some examples, a molten resin is injected into the magnet insertion holes 15 from below in a state in which the end surface 11*b* of the stack 11 that has been turned over faces up. In some examples, a molten resin is injected into the magnet insertion holes 15 from below in a state in which the end surface 11*a* of the stack 11 that has not been turned over faces up. Hence, a resin is injected from the same direction to form the stack 11 in which the protruding direction of the gate marks 17 coincides with the protruding direction of the burr 18*a* and the stack 11 in which the protruding direction of the gate marks 17 is opposite to the protruding direction of the burr 18*a*. With this configuration, the upper mold and the lower mold used for injecting the molten resin into the magnet insertion holes 15 can be shared during formation of the stacks 11 and 11 having different relations of the protruding direction of the gate marks 17 and the protruding direction of the burr 18a. Therefore, the manufacturing apparatus 100 of the rotor 1 can be simplified.

It is to be understood that not all aspects, advantages and features described herein may necessarily be achieved by, or included in, any one particular example embodiment. Indeed, having described and illustrated various examples herein, it should be apparent that other examples may be modified in arrangement and detail may be omitted.

Examples explained in the present description may be applied to a core product other than the rotor 1 (for example, a pair of core blocks forming a stacked stator core). Examples explained in the present description may be applied to a case where a stacked stator core (core product) is formed by stacking a pair of core blocks in which resin layers (solidified resin) for insulating the core block from a winding coil are provided on inner end surfaces (resin injection portions) of slots. For example, when the stacked stator core is formed by the core blocks stacked one on top of another, the gate marks formed on the resin layers provided on the inner end surface of the slots of one of the core blocks and the gate marks formed on the resin layers provided on the inner end surface of the slots of the other core block may protrude so as to face opposite directions. The core block of the stacked stator core may be divided core block formed by a plurality of core pieces being combined, or may be non-divided core block.

Examples explained in the present description may be applied to a case where the core block is formed by filling a molten resin into the resin injection portions (for example, through holes or grooves) extending in the height direction in order to bond the blanked members. The stack state of the pair of core blocks may be maintained by welding or an adhesive.

In some examples, the block body may be formed by anything other than the stack 11. For example, the block body may be a integrally formed object that includes the magnet insertion holes into which the permanent magnets are inserted. For example, the block body may be formed by ferromagnetic powders being compression-molded, or may be formed by a resin material containing ferromagnetic powders being injection-molded.

In some examples, the burr protruding in a direction from the end surface 11b to the end surface 11a may be provided to the circumferential edge of the shaft hole 11c in the core block B1, and the burr protruding in a direction from the end surface 11b to the end surface 11a may be provided to the circumferential edge of the shaft hole 11c in the core block B2. In this case, the shaft 2 may be inserted in the shaft hole 11c of the core block B1 from the end surface 11b side to the end surface 11a side, and the shaft 2 may be inserted in the shaft hole 11c of the core block B2 from the end surface 11b side to the end surface 11a side.

In some examples, the burr protruding in a direction from the end surface 11b to the end surface 11a may be provided to the circumferential edge of the shaft hole 11c in the core block B1, and the burr protruding in a direction from the end surface 11a to the end surface 11b may be provided to the circumferential edge of the shaft hole 11c in the core block B2. The burrs may protrude outward from the end surface 11a of the core block B1 and the end surface 11b of the core block B2, these end surfaces 11a and 11b facing outward. In this case, the core block B1 and the core block B2 may be attached to the shaft 2 from different directions. For example, the core block B1 may be attached from one end of the shaft 2 such that the shaft 2 is inserted from the end surface 11b side to the end surface 11a side of the core block B1. The core block B2 may then be attached from the other end of the shaft 2 such that the shaft 2 is inserted from the end surface 11a side to the end surface 11b side of the core block B2. In the process of manufacturing these core blocks B1 and B2, all of the stacks 11 may be transferred to the providing device 150 and other devices by the conveyors without being turned over, without use of the turnover device 140.

In some examples, identification holes may be provided in the end surface 11a. In this case, the identification holes may indicate that the droop is formed in the end surface 11a in the stack 11. Identification holes indicating the end surface in which the burr is formed may be provided in one of a pair of the stacks 11 and 11, and identification holes indicating the end surface in which the droop is formed may be provided in the other stack. The positions of the identification holes 19 in the radial direction may be substantially the same as the positions of the magnet insertion holes 15.

In some examples, the identification code 14 may be provided on the end surface 11a in the core block B1, and the identification code 14 may be provided on the end surface 11b in the core block B2. This configuration can simplify a configuration for reading individual information from the identification codes 14 and 14, as in the case where the identification codes 14 and 14 are provided to each of the end surfaces 11b and 11a facing each other. Moreover, since the end surfaces on which the identification codes 14 and 14 are formed face outward, the assemble state of the core blocks B1 and B2 can be checked by checking both of the identification codes 14 and 14, in the rotor 1 in which the core blocks B1 and B2 are assembled to the shaft 2.

In some examples, the permanent magnets 12 may be inserted in one magnet insertion hole 15. In this case, the permanent magnets 12 may align next to each other along the height direction in one magnet insertion hole 15, or may align in the longitudinal direction of the magnet insertion hole 15 (circumferential direction of the stack 11 when viewed in the height direction).

In some examples, the thickness of the stack 11 in the core block B1 may differ from the thickness of the stack 11 in the core block B2. For example, the number of blanked members W forming the stack 11 in the core block B1 may differ from the number of blanked members W forming the stack 11 in the core block B2. The positions of the magnet insertion holes 15 of the stack 11 in the core block B1 may be displaced from the positions of the magnet insertion holes 15 of the stack 11 in the core block B2, when viewed in the height direction.

In some examples, the conveyor Cv1 to Cv3 may not be used for transferring the stacks 11. For example, the stacks 11 may be manually transferred in a state of being placed in a container.

In some examples, the turnover device 140 may send the stack 11 turning over the stack 11 and send the stack 11 without turning over the stack 11 alternately, in units of numbers two or more. Alternatively, the number of stacks 11 to be successively sent being turned over may differ from the number of stacks 11 to be successively sent without being turned over.

In some examples, instead of the conveyor Cv1 and the conveyor Cv2, a main transfer conveyor extending from the blanking device 130 to the providing device 150 may be provided. In this configuration, when the stack 11 is sent to the providing device 150 without being turned over, the stack 11 may be sent to the providing device 150 in a state of being placed on the main transfer conveyor by the blanking device 130. Moreover, the turnover unit 149 may be provided somewhere along the transfer path of the main transfer conveyor, in parallel to the path. When the stack 11 is sent being turned over to the providing device 150, the stack 11 being transferred by the main transfer conveyor may be moved from the main transfer conveyor to the turnover unit 149. The stack 11 that has been turned over by the turnover unit 149 may be returned to the main transfer conveyor, and sent to the providing device 150 in a state of being turned over.

In some examples, the manufacturing apparatus 100 may not include the turnover device 140, but may include another resin insertion unit capable of injecting a resin into the magnet insertion holes from above, in addition to the resin insertion unit 169. In this case, when the stacks 11 are transferred to the resin insertion unit 169 and another resin insertion unit, the stacks 11 may be transferred by a branched transfer device, some of the stacks may be sent to the resin insertion unit 169, and the others may be sent to the other resin insertion unit. The mold used for injecting a resin in the resin insertion unit 169 may be integrally formed with the mold used for injecting a resin in another resin insertion unit.

In some examples, the resin insertion unit 169 may be configured to be injectable a molten resin from above to the magnet insertion holes 15 of both of the stacks 11 in the core blocks B1 and B2. In this case, the resin insertion unit 169 may not include the lower mold but may include the upper mold including the accommodation holes. The plungers may be configured to be inserted into and removed from the accommodation holes. A resin may be injected from above in a state in which the stack 11 is compressed in the height direction by the upper mold and the jig 152 (transfer plate 153).

In some examples, the resin injection device 160 may include a laser device below the conveyor Cv3 in order to detect the existence or non-existence of the identification holes 19 of the stack 11. The resin injection device 160 may include a plurality of laser devices disposed above and below the conveyor Cv3, in order to detect the existence or non-existence of the identification holes 19 of the stack 11. The disposed positions and the number of cameras and laser devices included in the resin injection device 160 may be any positions and any number as long as the posture of the stack 11 can be inspected.

In some examples, the stack 11 may not include the identification holes 19. In this case, the controller Ctr may identify the posture of the stack 11 by detecting whether or not the burr 18a exists. The controller Ctr may identify the posture of the stack 11 by detecting whether or not the identification holes 19 or the burr 18a exits based on image data obtained by imaging the stack 11.

In some examples, the posture of the stack 11 may be detected by detecting whether or not the identification holes 19 or the burr 18a exists, before the identification code 14 is formed to the stack 11 by the providing device 150. In this case, the possibility of forming the identification code on a wrong end surface can be reduced.

In some examples, the core block B1 and the core block B2 may be manufactured along different manufacturing lines. In this case, different blanking devices may perform blanking, or a single blanking device may perform blanking for two blanked members W that are the blanked member W forming the stack 11 of the core block B1 and the blanked member W forming the stack 11 of the core block B2, at substantially the same time.

ADDITIONAL EXAMPLES

An example core product may comprise a first core block and a second core block. The first core block may comprise a first block body including a first end surface, a second end surface, and a first resin injection portion extending from the first end surface to the second end surface. The first core block may further comprise a first solidified resin provided in the first resin injection portion, and a first gate mark integrated with the first solidified resin and protruding outward more than the first end surface. The second core block may comprise a second block body including a third end surface, a fourth end surface, and a second resin injection portion extending from the third end surface to the fourth end surface. The second core block may further comprise a second solidified resin provided in the second resin injection portion, and a second gate mark integrated with the second solidified resin and protruding outward more than the fourth end surface. The first core block and the second core block may be stacked such that the second end surface and the third end surface face each other. The example core product may be formed by the first core block and the second core block being stacked, which prevents the length of each of the resin injection portions from being long. The resin filled into the resin injection portion can therefore be uniform.

An example core product may further include a shaft inserted in a first shaft hole provided in the first block body and a second shaft hole provided in the second block body. In this case, the stack state of the first core block and the second core block can be maintained more reliably.

In some examples, the circumferential edge of the first shaft hole may be provided with a first burr protruding in a direction from the first end surface to the second end surface. The circumferential edge of the second shaft hole may be provided with a second burr protruding in a direction from the side of the third end surface to the side of the fourth end surface. For example, the shaft is inserted in the shaft holes 11c and 11c such that the insertion direction of the shaft coincides with the protruding directions of the first burr and the second burr, whereby the first burr and the second burr are prevented from falling off at the time of insertion of the shaft.

In some examples, the first core block may further include a first identification code storing individual information of the first core block. The second core block may further include a second identification code storing individual information of the second core block. The first identification code and the second identification code may be formed on the first end surface and the fourth end surface, respectively, or on the second end surface and the third end surface, respectively. For example, when a molten resin is injected into the first resin injection portion and the second resin injection portion from below in the process of manufacturing the first core block and the second core block, the first core block body and the second block body may be transferred in a state in which both of the first identification code and the second identification code face up or face down. When a molten resin is injected into the first resin injection portion and the second resin injection portion from above, the first block body and the second block body should be transferred in a state in which both of the first identification code and the second identification code face up or face down. This can simplify a configuration for reading individual information from the first identification code and the second identification code.

An example method of manufacturing a core product may comprise: forming a first core block by injecting a molten resin into a first resin injection portion extending from a first end surface to a second end surface of a first block body, such that a first solidified resin is provided in a first resin injection portion and a first gate mark is integrated with the first solidified resin and protrudes outward more than the first end surface. The example method may further comprise forming a second core block by injecting a molten resin into a second resin injection portion extending from a third end surface to a fourth end surface of a second block body, such that a second solidified resin is provided in the second resin injection portion and a second gate mark is integrated with the second solidified resin and protrudes outward more than the fourth end surface. The example method may still further comprise stacking the first core block and the second core block such that the second end surface and the third end surface face each other. As with the foregoing, the core product is formed by the first core block and the second core block being stacked, and thus the length of each of the resin injection portions is not large. The resin filled into the resin injection portion can therefore be uniform.

An example method may further comprise inserting a shaft into a first shaft hole provided in the first block body and a second shaft hole provided in the second block body. In the method in the fifth example, the circumferential edge of the first shaft hole may be provided with a first burr protruding in a direction from the side of the first end surface to the side of the second end surface. The circumferential edge of the second shaft hole may be provided with a second burr protruding in a direction from the side of the third end surface to the side of the fourth end surface. The inserting the shaft may include inserting the shaft into the first shaft hole and the second shaft hole such that the insertion direction of the shaft coincides with the protruding directions of the first burr and the second burr. In this case, a stack state of the first core block and the second core block can be maintained more reliably. Moreover, this prevents the first burr and the second burr from falling off at the time of insertion of the shaft.

An example method may still further comprise detecting which of the first end surface and the second end surface faces up, before forming the first core block, in order to identify the posture of the first block body, and detecting which of the third end surface and the fourth end surface faces up, before forming the second core block, in order to identify the posture of the second block body. This can prevent the first core block and the second core block from being formed, for example, in a state in which the protruding direction of the gate marks are wrong, because the first core block and the second core block can be formed after inspecting which end surface faces up, in this case.

Additionally, an example method may further comprise forming, on either one of the first end surface and the second end surfaces, a first identification code storing individual information of the first core block, and forming, on either one of the third end surface and the fourth end surface, a second identification code storing individual information of the second core block. Stacking the first core block and the second core block may include stacking the first core block having the first end surface, on which the first identification code is formed, and the second core block having the fourth end surface, on which the second identification code is formed, such that the second end surface and the third end surface face each other, or stacking the first core block having the second end surface, on which the first identification code is formed, and the second core block having the third end surface, on which the second identification code is formed, such that the second end surface and the third end surface face each other. In this case, a configuration for reading individual information from the first identification code and the second identification code can be simplified, as with the foregoing.

In some examples, forming the first core block may include injecting, from above, a molten resin into the first resin injection portion in a state in which the first end surface faces up. In some examples, forming the second core block may include injecting, from above, a molten resin into the second resin injection portion in a state in which the fourth end surface faces up. In this case, molds used for injecting a molten resin into the first resin injection portion and the second resin injection portion can be shared. As a result, the apparatus for manufacturing a core product can be simplified.

In some examples, forming the first core block may include injecting, from below, a molten resin into the first resin injection portion in a state in which the first end surface faces down. In some examples, forming the second core block may include injecting, from below, a molten resin into the second resin injection portion in a state in which the fourth end surface faces down. In this case, molds for injecting a molten resin into the first resin injection portion and the second resin injection portion can be shared. As a result, the apparatus for manufacturing a core product can be simplified.

We claim all modifications and variations coming within the spirit and scope of the subject matter claimed herein.

The invention claimed is:

1. A core product comprising a first core block and a second core block,
    wherein the first core block includes:
        a first block body including a first end surface, a second end surface, and a first resin injection portion extending from the first end surface to the second end surface;
        a first solidified resin provided in the first resin injection portion; and
        a first gate mark integrated with the first solidified resin and protruding outward more than the first end surface,
    wherein the second core block includes:
        a second block body including a third end surface, a fourth end surface, and a second resin injection portion extending from the third end surface to the fourth end surface;
        a second solidified resin provided in the second resin injection portion; and
        a second gate mark integrated with the second solidified resin and protruding outward more than the fourth end surface, and
    wherein the first core block and the second core block are stacked such that the second end surface and the third end surface face each other.

2. The core product according to claim 1, further comprising a shaft inserted in a first shaft hole provided in the first block body and a second shaft hole provided in the second block body.

3. The core product according to claim 2,
    wherein a circumferential edge of the first shaft hole includes a first burr protruding in a first direction from the first end surface to the second end surface, and
    wherein a circumferential edge of the second shaft hole includes a second burr protruding in a second direction from the third end surface to the fourth end surface.

4. The core product according to claim 1, wherein the first core block further includes a first identification code storing individual information of the first core block, wherein the second core block further includes a second identification code storing individual information of the second core block, and wherein the first identification code and the second identification code are formed on the first end surface and the fourth end surface, respectively, or on the second end surface and the third end surface, respectively.

5. A method of manufacturing a core product, the method comprising:

forming a first core block by injecting a molten resin into a first resin injection portion extending from a first end surface to a second end surface of a first block body, such that a first solidified resin is provided in the first resin injection portion and that a first gate mark is integrated with the first solidified resin and protrudes outward more than the first end surface;

forming a second core block by injecting a molten resin into a second resin injection portion extending from a third end surface to a fourth end surface of a second block body, such that a second solidified resin is provided in the second resin injection portion and that a second gate mark is integrated with the second solidified resin and protrudes outward more than the fourth end surface; and stacking the first core block and the second core block such that the second end surface and the third end surface face each other.

6. The method according to claim 5, further comprising inserting a shaft into a first shaft hole provided in the first block body and a second shaft hole provided in the second block body, wherein a circumferential edge of the first shaft hole includes a first burr protruding in a first direction from the first end surface to the second end surface, wherein a circumferential edge of the second shaft hole includes a second burr protruding in a second direction from the third end surface to the fourth end surface, and wherein inserting the shaft includes inserting the shaft into the first shaft hole and the second shaft hole such that an insertion direction of the shaft coincides with the first direction and the second direction.

7. The method according to claim 5, further comprising:

detecting which of the first end surface and the second end surface faces up, in order to identify a posture of the first block body, before forming the first core block; and detecting which of the third end surface and the fourth end surface faces up, in order to identify a posture of the second block body, before forming the second core block.

8. The method according to claim 5, further comprising:

forming a first identification code storing individual information of the first core block on either one of the first end surface and the second end surface; and forming a second identification code storing individual information of the second core block on either one of the third end surface and the fourth end surface, wherein stacking the first core block and the second core block includes:

stacking the first core block and the second core block such that the second end surface and the third end surface face each other, the first identification code being formed on the first end surface, the second identification code being formed on the fourth end surface; or stacking the first core block and the second core block such that the second end surface and the third end surface face each other, the first identification code being formed on the second end surface, the second identification code being formed on the third end surface.

9. The method according to claim 5, wherein forming the first core block includes injecting a molten resin into the first resin injection portion from above in a state in which the first end surface faces up, and wherein forming the second core block includes injecting a molten resin into the second resin injection portion from above in a state in which the fourth end surface faces up.

10. The method according to claim 5, wherein forming the first core block includes injecting a molten resin into the first resin injection portion from below in a state in which the first end surface faces down, and forming the second core block includes injecting a molten resin into the second resin injection portion from below in a state in which the fourth end surface faces down.

* * * * *